Jan. 7, 1958  S. M. MOODY  2,818,744
LINEAR ACTUATOR WITH JOINTLY ADJUSTABLE STOPS
Filed March 9, 1956

INVENTOR.
Steven M. Moody
BY
Leonard S. Khinfill
Attorney

United States Patent Office 2,818,744
Patented Jan. 7, 1958

2,818,744

LINEAR ACTUATOR WITH JOINTLY ADJUSTABLE STOPS

Steven M. Moody, Grand Rapids, Mich., assignor to Lear, Incorporated, Grand Rapids, Mich., a corporation of Illinois Application March 9, 1956, Serial No. 570,482

4 Claims. (Cl. 74—424.8)

This invention relates to linear actuators, sometimes termed "screwjacks." In particular it has reference to mechanism adapted for incorporation with a screwjack for limiting the stroke thereof to a precise range and which includes means for adjusting the stroke in response to power input as contrasted with manual adjustment.

Screwjacks find frequent application to environments wherein the stroke must be exactly limited, i. e. overtravel must be zero. Sometimes the range of movement of the actuated member remains constant but the end points are to be shifted. The invention mechanism is particularly adapted to such situations.

Additionally, and especially aboard aircraft, screwjacks are nearly always so located that ready access, as for purposes of adjustment, is not feasible. The invention therefore has, as one of its objects, stroke adjustment means adapted for power actuation by means incorporated in the actuator and under the control of a switch positioned remotely therefrom.

In one of its aspects the invention comprehends mechanism in accordance with the foregoing further characterized by means to provide a greater or lesser stroke in one direction than in the other in addition to alteration in the end positions of the stroke.

Other objects will become apparent from the following description which, taken with the accompanying drawing, discloses a preferred mode of embodying the invention in practice.

Figure 1:
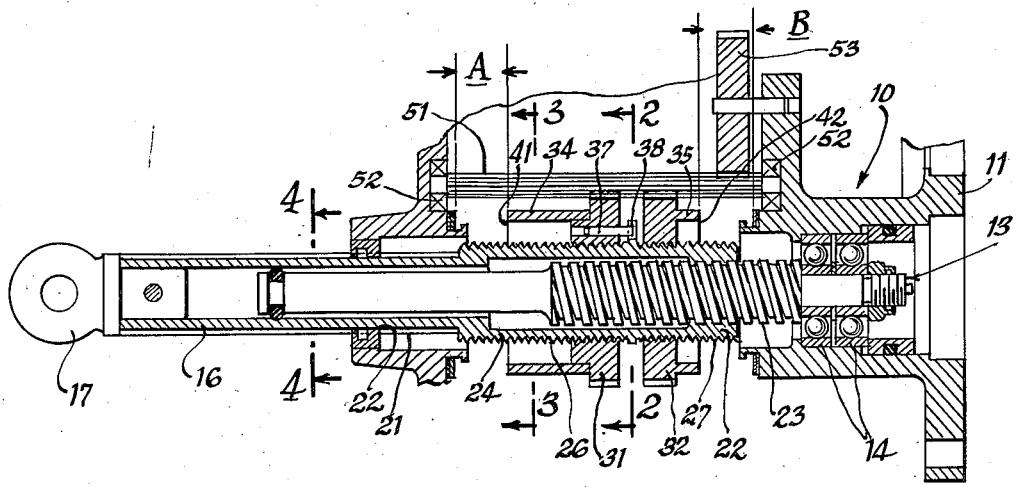
Figure 2:
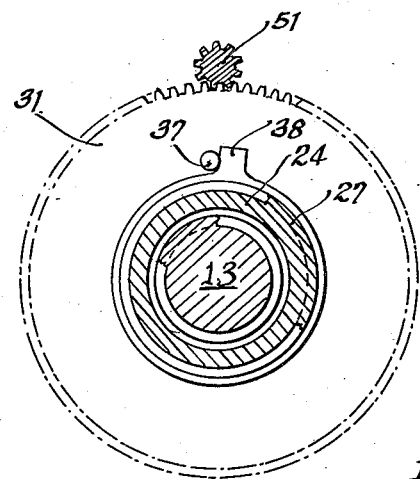
Figure 3:
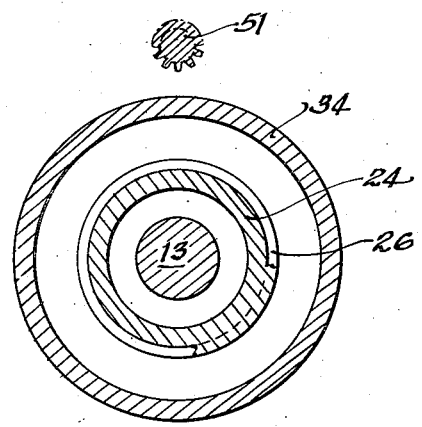
Figure 4:
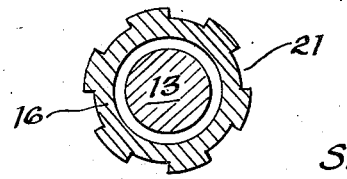

In this drawing:

Fig. 1 is a longitudinal cross section through a portion of a linear actuator incorporating the invention mechanism; and Figs. 2, 3, and 4 are transverse cross sections taken on the lines 2—2, 3—3 and 4—4 respectively of Fig. 1.

In a broad sense the invention comprehends the incorporation with a linear actuator of power-motivated stroke-adjusting means. In such actuators (screwjacks) a power-driven, rotatable screw coacts with a non-rotatable nut to which a torque tube is secured. The latter attaches to the actuated member while the frame of the actuator is fixed. In the alternative the end of the torque tube may be fixed and the frame made movable. As respects the adjusting means of the invention the exterior of the nut is in the form of a sleeve which is threaded on its periphery in a right and left hand lead beginning at some center point. A stop nut is threaded on each of the right and left hand threads and these nuts are provided with gear teeth in mesh with a common pinion rod arranged to be power driven independently of the source which drives the screwjack proper. Thus, upon rotation of the pinion both stop nuts are traversed linearly in opposite directions on the respective non-rotatable screws some desired amounts to alter their relationship with the framework. Each stop nut has a portion abuttable against the framework. Accordingly, for each adjusted position of the stop nuts a predetermined travel of the main nut will result. When both the right and left hand threads are of the same pitch the end limits of the stroke are interdependent whereas if one is of different pitch the end limits may be established independently in some ratio which is dependent on the relative pitches.

Turning to the drawing I have shown a linear actuator or screwjack comprising a framework 10 upon a flange 11 of which a source of power (not shown) is carried. This may be an electric or other motor but in any case provides rotation of the screw 13 when the motor is energized, as will be understood. Screw 13 is journalled at one end in bearings 14 and is supported to a moderate extent at the free end upon the torque tube 16. An eye 17 is attached to the end of the torque tube whereby the actuator may be connected to a part to be operated thereby, it being understood that the frame 10 is fixed. Torque tube 16 may be supported for reciprocating movement in any well-known manner and is restrained against rotation by splines, as at 21, (Fig. 4) engaged in corresponding splines 22 in the framework. As thus far described the arrangement is conventional.

The main nut 22, engaged with the threads 23 of the screw 13, is a part of a sleeve 24 which continues forwardly to join the torque tube 16 and by means of which linear traverse of the nut 22 is communicated to the torque tube.

Sleeve 24 is provided on its exterior with a left hand thread 26 and a right hand thread 27 although the same may be the inverse, as will appear. The two threads may be of any desired form, lead and pitch, identical or different. If of like pitch nuts carried thereon for traverse axially thereof will move at the same rate, i. e. displacement, and in opposite directions. If of different pitch the nuts will still move oppositely but at different rates proportioned to the pitches. The threads may be of single or multiple lead to provide the same or different linear rates, in a manner similar to that just pointed out.

An annular nut 31 is carried on the threaded portion 26 and another similar nut on the portion 27. Each is provided with annular stops 34 and 35 respectively adapted to arrest linear movement of the sleeve 24 by abutment of one or the other of the faces 41 or 42 with the pertinent part of the framework. To avoid jamming at the center position at least one of the nuts 31 or 32 is provided with a pin 37 arranged to abut a projection 38 of the sleeve 24.

At this juncture it will have become apparent that, since the sleeve 24 is non-rotatable, the nuts 31 and 32 may be traversed linearly by rotation thereof upon their respective threads 26 and 27 and thus to vary the distance between the faces 41 and 42. As this dimension is increased the stroke of the actuator is decreased. That is to say the spaces A and B may be varied within the limits for which the specific actuator is designed. If different pitches or leads are used on each of the threaded portions then A may be altered a different amount than B for each revolution of the nuts 31 and 32.

Desirably the nuts 31 and 32 are rendered adjustable jointly and preferably by power. To this end the periphery of each nut is provided with gear teeth in mesh with a pinion rod 51 rotatably supported in bearings 52—52 and driven by a gear 53 connected to some convenient, remotely controllable, reversible power source (not shown). Thus, notwithstanding inaccessibility of the actuator and, in particular, the stroke-adjusting mechanism, variation in stroke may be readily accomplished from a remote point. It will be clear that, since the nuts 31 and 32 are rotated from a common drive pinion, the respective threads 26 and 27 must be left and right handed. Obviously the reverse is possible but, in that case, the stop pin 37 will be arrested on the opposite face of the projection 38.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. Adjustable stroke-setting mechanism for linear actuators of the nut and screw type in which extension and retraction of the operating member of the actuator is effected by rotating the screw in a non-rotatable but axially-traversible nut and which actuator includes a framework comprising: a cylindrical part secured to the nut for traverse therewith, said part having a thread on its periphery, a stop nut threadedly engaged on said thread and adapted to abut a portion of the frame to limit the stroke upon actuation of the nut, and means for moving said stop nut along its thread to alter the length of the stroke in at least one direction.

2. Mechanism in accordance with claim 1 wherein said means comprises a gear teeth on said stop nut, a pinion rod in mesh with said teeth and means for rotating said pinion.

3. Adjustable stroke-setting mechanism for linear actuators of the nut and screw type in which extension and retraction of the operating member of the actuator is effected by rotating the screw in a non-rotatable but axially-traversible nut and which actuator includes a framework comprising: a cylindrical part secured to the nut for traverse therewith, said part having a left hand thread on one portion of its periphery and a right hand thread on another portion of its periphery, a pair of stop nuts each threadedly engaged with one of said threads and each nut being adapted to abut respective portions of the frame to limit the stroke upon actuation of the nut, and means for moving said stop nuts along their respective threads to alter the length of the stroke in both directions.

4. Mechanism in accordance with claim 3 wherein said means comprises gear teeth on said stop nuts, a pinion rod commonly in mesh with said teeth and means for rotating said pinion rod.

No references cited.